US011332045B2

(12) United States Patent
Oikawa et al.

(10) Patent No.: US 11,332,045 B2
(45) Date of Patent: May 17, 2022

(54) OPERATION SYSTEM AND CONTROL METHOD

(71) Applicant: ALPINE ELECTRONICS, INC., Tokyo (JP)

(72) Inventors: Taku Oikawa, Tokyo (JP); Takashi Ichikawa, Tokyo (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 11 days.

(21) Appl. No.: 16/983,199

(22) Filed: Aug. 3, 2020

(65) Prior Publication Data
US 2021/0061135 A1 Mar. 4, 2021

(30) Foreign Application Priority Data

Aug. 29, 2019 (JP) .............................. JP2019-157061

(51) Int. Cl.
*B60N 2/01* (2006.01)
*B60K 37/06* (2006.01)
*B60N 2/02* (2006.01)
*B60W 60/00* (2020.01)

(52) U.S. Cl.
CPC .......... *B60N 2/0244* (2013.01); *B60W 60/001* (2020.02); *B60N 2002/0212* (2013.01); *B60N 2002/0272* (2013.01); *B60W 2540/047* (2020.02)

(58) Field of Classification Search
CPC .......... B60N 2/0244; B60N 2002/0212; B60N 2002/0272; B60W 60/001; B60W 2540/047
See application file for complete search history.

(56) References Cited

U.S. PATENT DOCUMENTS

2018/0356897 A1* 12/2018 Hoggarth ................. B60N 2/02
2020/0189418 A1*  6/2020 Sailer ...................... B60N 2/062

FOREIGN PATENT DOCUMENTS

JP    H09-175288    7/1997
WO    2019/135358   7/2019

OTHER PUBLICATIONS

Extended European Search Report for 20190837.3 dated Jan. 20, 2021.

* cited by examiner

*Primary Examiner* — Mathew Franklin Gordon
(74) *Attorney, Agent, or Firm* — IPUSA, PLLC

(57) ABSTRACT

An operation system for a vehicle includes a memory, and a processor coupled to the memory and configured to acquire a first signal indicating whether a seat in the vehicle is facing forward or rearward, and generate a display screen by arranging at least two operation elements in a longitudinal direction of the vehicle. The display screen is displayed on an operation panel installed in the vehicle. The processor reverses the arrangement of the at least two operation elements in the longitudinal direction of the vehicle in accordance with the first signal.

7 Claims, 10 Drawing Sheets

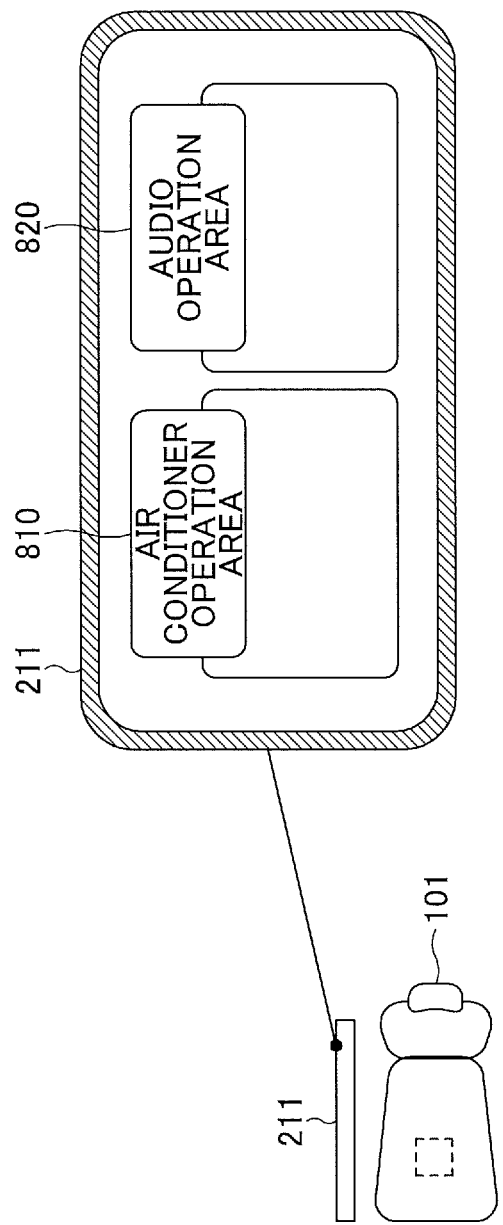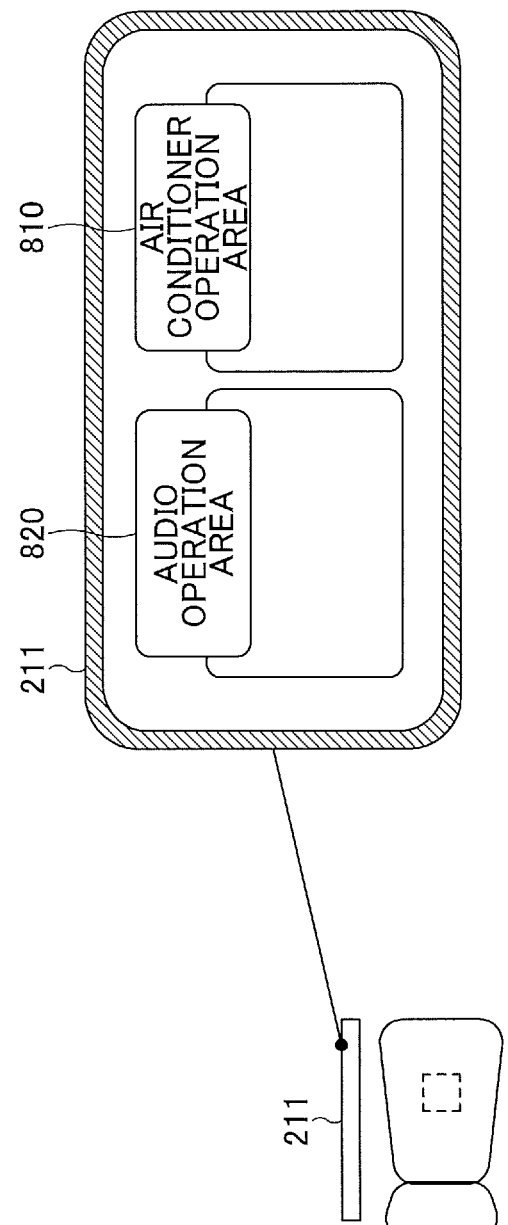

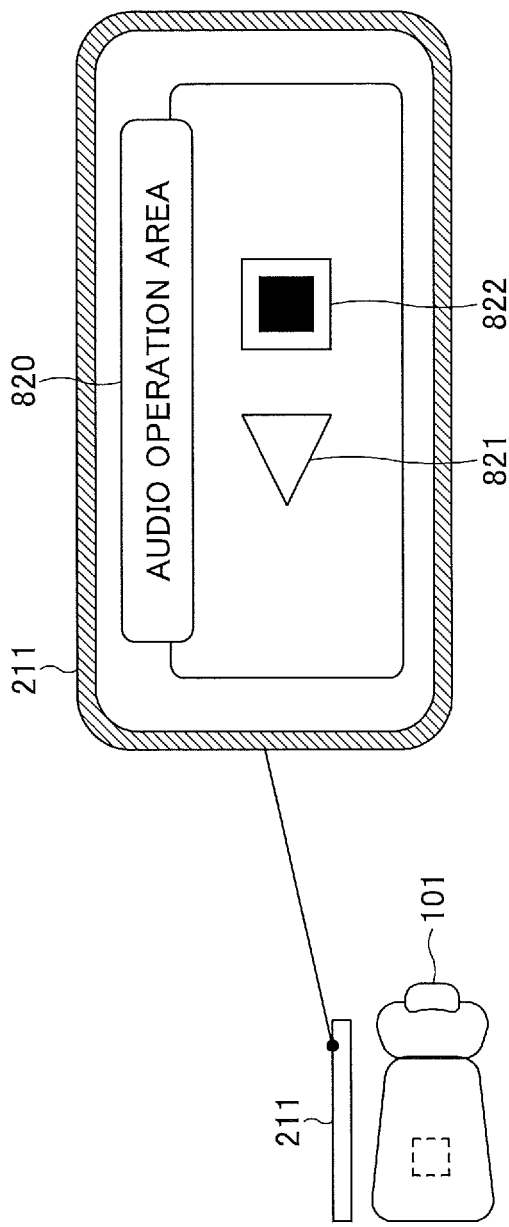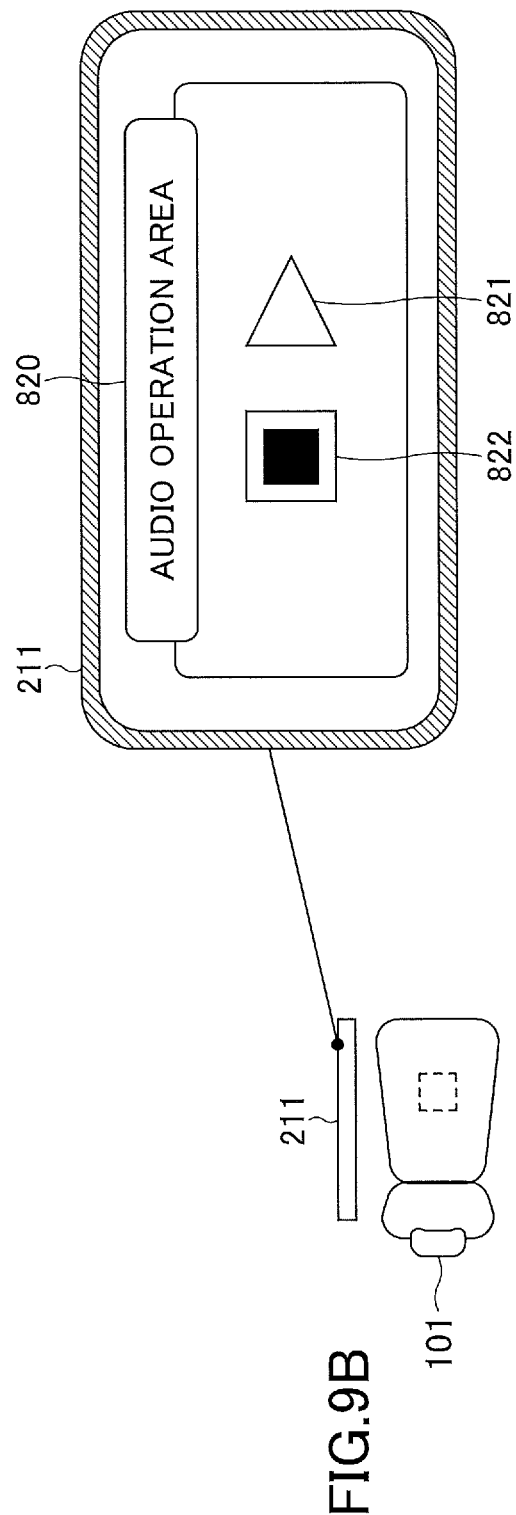

OPERATION SYSTEM AND CONTROL METHOD

CROSS-REFERENCE TO RELATED APPLICATIONS

This application is based on and claims priority to Japanese Patent Application No. 2019-157061, filed on Aug. 29, 2019, the entire contents of which are incorporated herein by reference.

BACKGROUND OF THE INVENTION

1. Field of the Invention

The disclosures herein relate to an operation system and a control method.

2. Description of the Related Art

Typically, the layout of seats in a vehicle is designed such that occupants are seated facing forward. For this reason, assuming that an occupant is seated facing forward, operation elements are arranged on a display of an operation panel that is disposed at a corresponding position of each of the seats in the vehicle (such as a panel disposed beside each of the seats to operate various devices).

In recent years, the development of autonomous driving has progressed. If fully autonomous driving is put into practical use, a face-to-face seat configuration may become possible in which a driver's seat and a front passenger's seat are rotated such that occupants in the front and back can be seated facing each other.

However, if a seat is rotated, an occupant may feel discomfort when operating an operation panel. For example, in a case where one operation element is located on the near side of the operation panel and the other operation element is located on the far side when viewed from the occupant while facing forward, the operation elements when viewed from the perspective of the occupant while facing rearward are reversed.

RELATED-ART DOCUMENTS

Patent Documents

[Patent Document 1] Japanese Laid-Open Patent Publication No. 9-175288

SUMMARY OF THE INVENTION

It is a general object of the described embodiments to reduce discomfort when an occupant operates an operation panel after the direction of a seat is changed.

According to an embodiment, an operation system to be installed in a vehicle is provided. The operation system includes a memory, and a processor coupled to the memory and configured to acquire a first signal indicating whether a seat in the vehicle is facing forward or rearward, and generate a display screen by arranging at least two operation elements in a longitudinal direction of the vehicle. The display screen is displayed on an operation panel installed in the vehicle. The processor reverses the arrangement of the at least two operation elements in the longitudinal direction of the vehicle in accordance with the first signal.

According to an embodiment, a control method includes acquiring a signal indicating whether a seat in a vehicle is facing forward or rearward, and generating a display screen by arranging at least two operation elements in a longitudinal direction of the vehicle, the display screen being displayed on an operation panel installed in the vehicle. The generating includes reversing the arrangement of the at least two operation elements in the longitudinal direction of the vehicle in accordance with the signal.

BRIEF DESCRIPTION OF THE DRAWINGS

Other objects and further features of the present invention will be apparent from the following detailed description when read in conjunction with the accompanying drawings, in which:

FIGS. 8A and 8B are diagrams illustrating first examples of display screens displayed on a side operation panel;

FIGS. 9A and 9B are diagrams illustrating second examples of display screens displayed on the side operation panel.

DESCRIPTION OF THE EMBODIMENTS

According to an embodiment, it is possible to reduce discomfort when an occupant operates an operation panel after the direction of a seat is changed.

In the following; embodiments of the present invention will be described with reference to the accompanying drawings. In the specification and drawings, elements having substantially the same functions or configurations are denoted by the same numerals, and a duplicate description thereof will not be provided.

First Embodiment

<Direction of Seat in Vehicle>

Figure 1A:
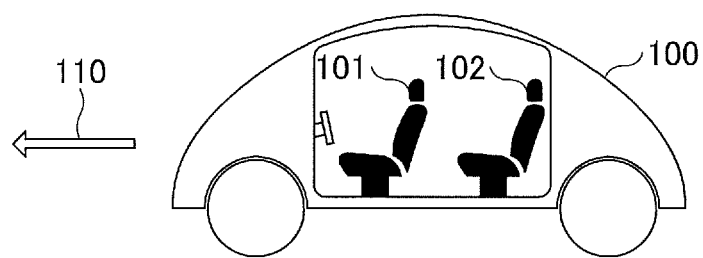
FIGS. 1A and 1B are diagrams illustrating the direction of a seat in a vehicle in which an operation system is installed.
Figure 1B:
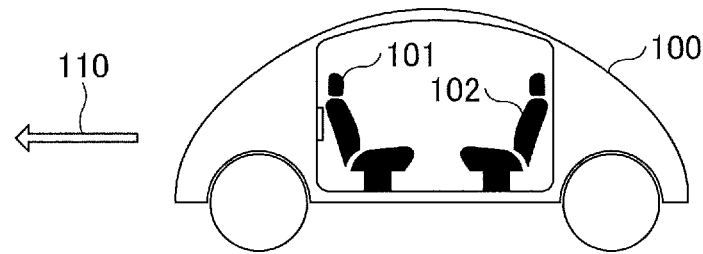

First, the direction of a seat in a vehicle, in which an operation system according to a first embodiment is installed, will be described. FIGS. 1A and 1B are diagrams illustrating the direction of a seat in a vehicle in which an operation system is installed.

FIGS. 1A and 1B illustrate simplified side views of a vehicle 100 including an autonomous driving function and a manual driving function. Although side doors are not depicted for convenience of illustration in FIGS. 1A and 1B, the vehicle 100 includes a total of four doors on the sides, and side operation panels for operating various in-vehicle devices are installed on the respective side doors.

FIG. 1A illustrates a state in which the vehicle 100 is in manual driving mode, and is being driven in a forward direction (in a direction indicated by an arrow 110) by a driver (not illustrated). As illustrated in FIG. 1A, when the vehicle 100 is in the manual driving mode, at least a driver's seat 101 faces the front of the vehicle 100 (in the direction indicated by the arrow 110).

Conversely, FIG. 1B illustrates a state in which the vehicle 100 is in autonomous driving mode, and is moving in the forward direction (in the direction indicated by the arrow 110). As illustrated in FIG. 1B, when the vehicle 100 is in autonomous driving mode, the driver's seat 101 does not need to face the front of the vehicle 100 (in the direction indicated by the arrow 110), and may face the rear of the vehicle 100 (in a direction opposite to the direction indicated by the arrow 110). In FIG. 1B, an example in which the driver's seat 101 facing rearward has been described; however, another seat (such as a front passenger's seat) may face rearward.

As described, the seats in the vehicle 100 may be rotated to face the front or the rear of the vehicle 100. When the vehicle 100 is in autonomous driving mode, occupants may be seated face-to-face as illustrated in FIG. 1B.

<System Configuration of Operation System>

Figure 2:
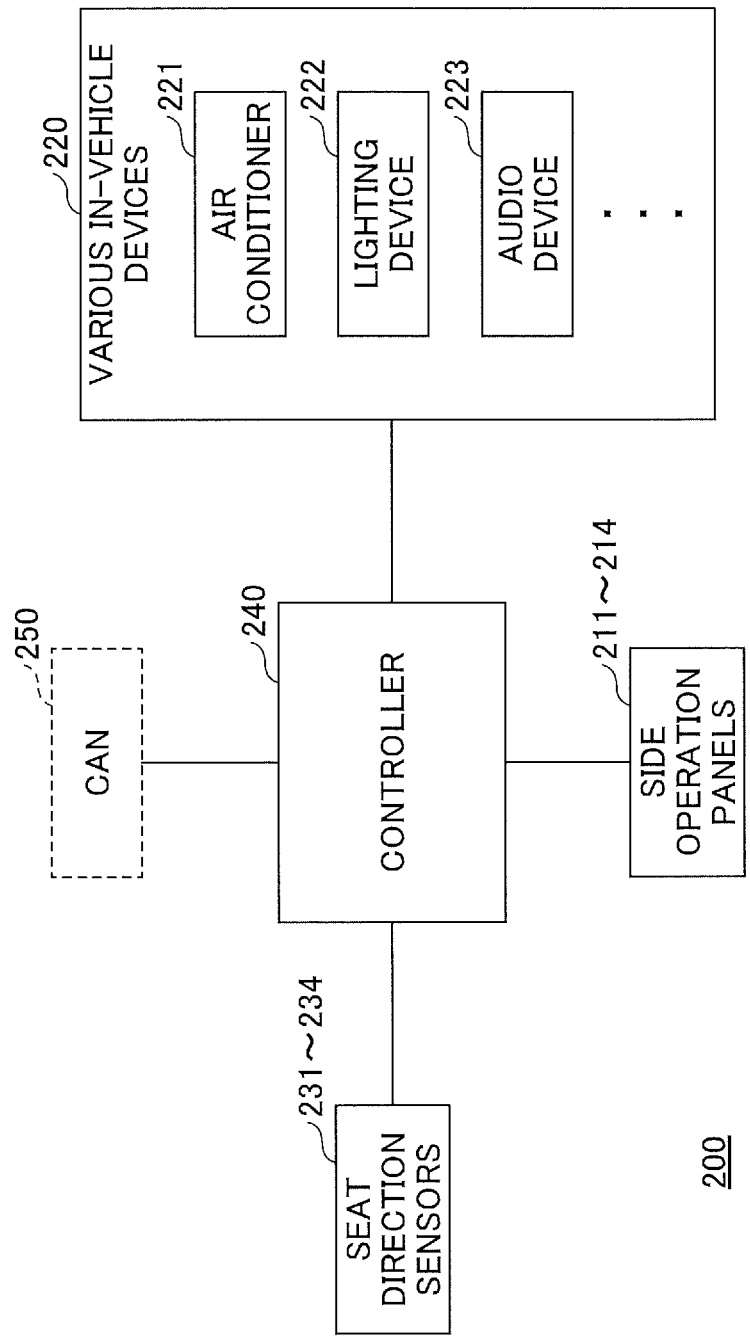
FIG. 2 is a diagram illustrating an example of a system configuration of the operation system.

Next, a system configuration of the operation system according to the first embodiment installed in the vehicle 100 will be described. FIG. 2 is a diagram illustrating an example of a system configuration of the operation system. As illustrated in FIG. 2, an operation system 200 includes side operation panels 211 to 214, various in-vehicle devices 220, seat direction sensors 231 to 234, and a controller 240.

The side operation panels 211 to 214 are input devices for operating the various in-vehicle devices 220, and include display functions and position input functions. The side operation panels 211 to 214 are what are known as touch panels. Display screens displayed on the side operation panels 211 to 214 include operation elements for operation of the various in-vehicle devices 220. The display screens are generated by the controller 240. Further, each of the side operation panels 211 to 214 receives an operation of an occupant, and transmits a position input signal to the controller 240.

For example, the various in-vehicle devices 220 may include an air conditioner 221, a lighting device 222, and an audio device 223. The various in-vehicle devices 220 are operated based on control signals from the controller 240.

The seat direction sensors 231 to 234 are sensors that detect the directions of the four seats in the vehicle 100 where the driver and the passengers are seated, and are connected to the controller 240. Each of the seat direction sensors 231 to 234 outputs a forward-facing seat signal (a signal indicating that a seat is facing forward) when the corresponding occupant is seated facing the front of the vehicle 100. In addition, each of the seat direction sensors 231 to 234 outputs a rearward-facing seat signal (a signal indicating that a seat is facing rearward) when each corresponding occupant is seated facing the rear of the vehicle 100.

The controller 240 generates display screens that include operation elements for operating various in-vehicle devices 220, and transmits the display screens to the side operation panels 211 to 214. When the controller 240 generates the display screens to be displayed on the side operation panels 211 to 214, the controller 240 arranges the operation elements for operating the various in-vehicle devices 220 in accordance with signals transmitted from the seat direction sensors 231 to 234. In addition, when a position input signal is output from any of the side operation panels 211 to 214, which have received the display screens, the controller 240 generates a control signal in accordance with the position input signal, and transmits the control signal to a corresponding in-vehicle device 220.

The controller 240 is connected to a network (controller area network (CAN) 250) in the vehicle 100, and acquires a signal indicating whether the vehicle 100 is in autonomous driving mode or in manual driving mode. Accordingly, the controller 240 can generate a display screen to be displayed on the side operation panel 211 based on whether the vehicle 100 is in autonomous driving mode or in manual driving mode.

<Example of Arrangement of Components Constituting Operation System>

Next, an example of the arrangement of components (such as the side operation panels 211 to 214, the various in-vehicle devices 220, and the seat direction sensors 231 to 234) constituting the operation system 200 will be described.

Figure 3:
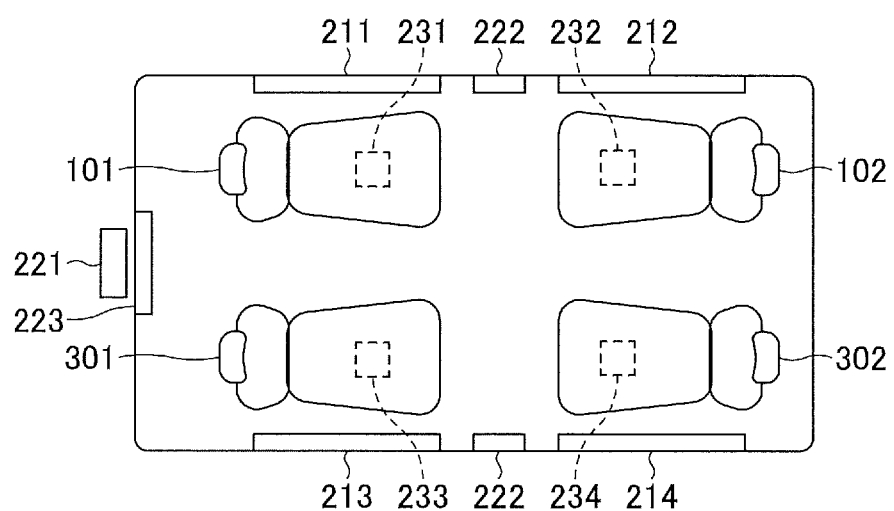
FIG. 3 is diagram illustrating an example of the arrangement of components constituting the operation system.

FIG. 3 is diagram illustrating an example of the arrangement of components constituting the operation system. FIG. 3 illustrates the inside of the vehicle 100 when viewed from above. As illustrated in FIG. 3, the side operation panel 211 is installed on the inner side of a door located beside the driver's seat 101, and is operated by the driver seated in the driver's seat 101. Similarly, the side operation panel 212 is installed on the inner side of a door located beside a rear seat 102, and is operated by a passenger seated in the rear seat 102.

Similarly, the side operation panel 213 is installed on the inner side of a door located beside a front seat 301, and is operated by a passenger seated in the front seat 301. Similarly, the side operation panel 214 is installed on the inner side of a door located beside a rear seat 302, and is operated by a passenger seated in the rear seat 302.

Further, as illustrated in FIG. 3, the audio device 223 is installed at the front center position of the vehicle 100, and the air conditioner 221 is installed behind the audio device 223 (air outlets of the air conditioner 221 are located at corresponding positions of the respective seats in the vehicle 100). The lighting device 222 is installed at the center of each side of the vehicle 100.

Further, as illustrated in FIG. 3, the seat direction sensor 231, the seat direction sensor 232, the seat direction sensor 233, and the seat direction sensor 234 are installed on the underside of the driver's seat 101, the rear seat 102, the front seat 301, and the rear seat 102, respectively.

Although not illustrated in FIG. 3, the controller 240 may be installed behind the audio device 223, for example.

<Hardware Configuration of Controller>

Figure 4:
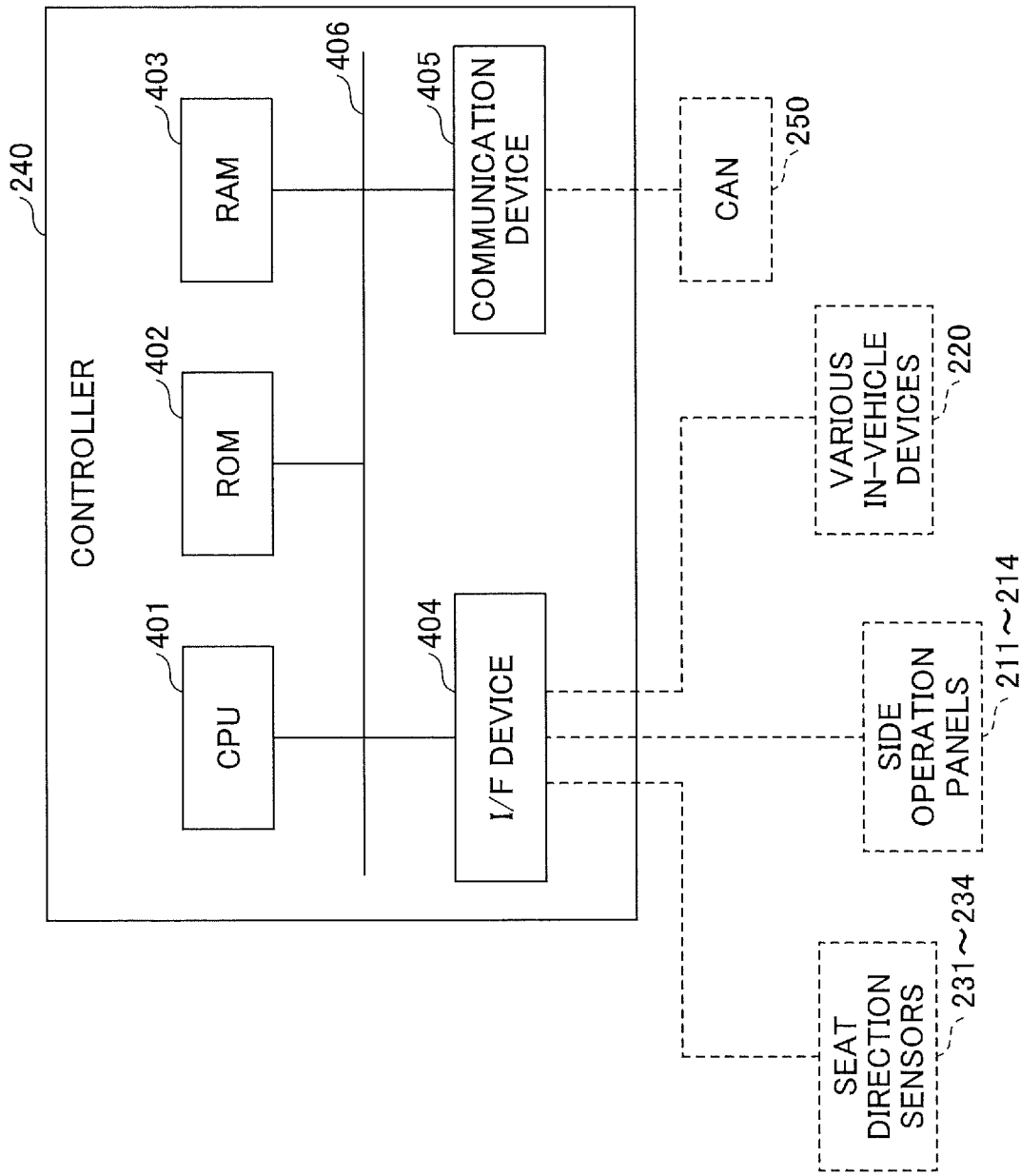
FIG. 4 is a diagram illustrating an example of a hardware configuration of a controller.

Next, a hardware configuration of the controller 240 will be described. FIG. 4 is a diagram illustrating an example of the hardware configuration of the controller. As illustrated in FIG. 4, the controller 240 includes a central processing unit (CPU) 401, a read-only memory (ROM) 402, and a random-access memory (RAM) 403. In addition, the controller 240 includes an interface (I/F) device 404 and a communication device 405. The components of the controller 240 are connected to each other via a bus 406.

The CPU 401 is an arithmetic device that executes various programs (such as a control program to be described later) installed in the ROM 402. The ROM 402 is a non-volatile memory, and functions as a main storage device that stores the various programs executed by the CPU 401 and information used by the CPU 401 when executing the various programs.

The RAM 403 is a volatile memory such as a dynamic random access memory (DRAM) or a static random access memory (SRAM). The RAM 403 functions as a main storage device that provides a workspace used when the various programs installed in the ROM 402 are executed by the CPU 401.

The I/F device 404 is a connection device for connecting the side operation panels 211 to 214, the various in-vehicle devices 220, and the seat direction sensors 231 to 234. The communication device 405 is a communication device for communicating with the CAN 250.

<Functional Configuration of Controller>

Figure 5:
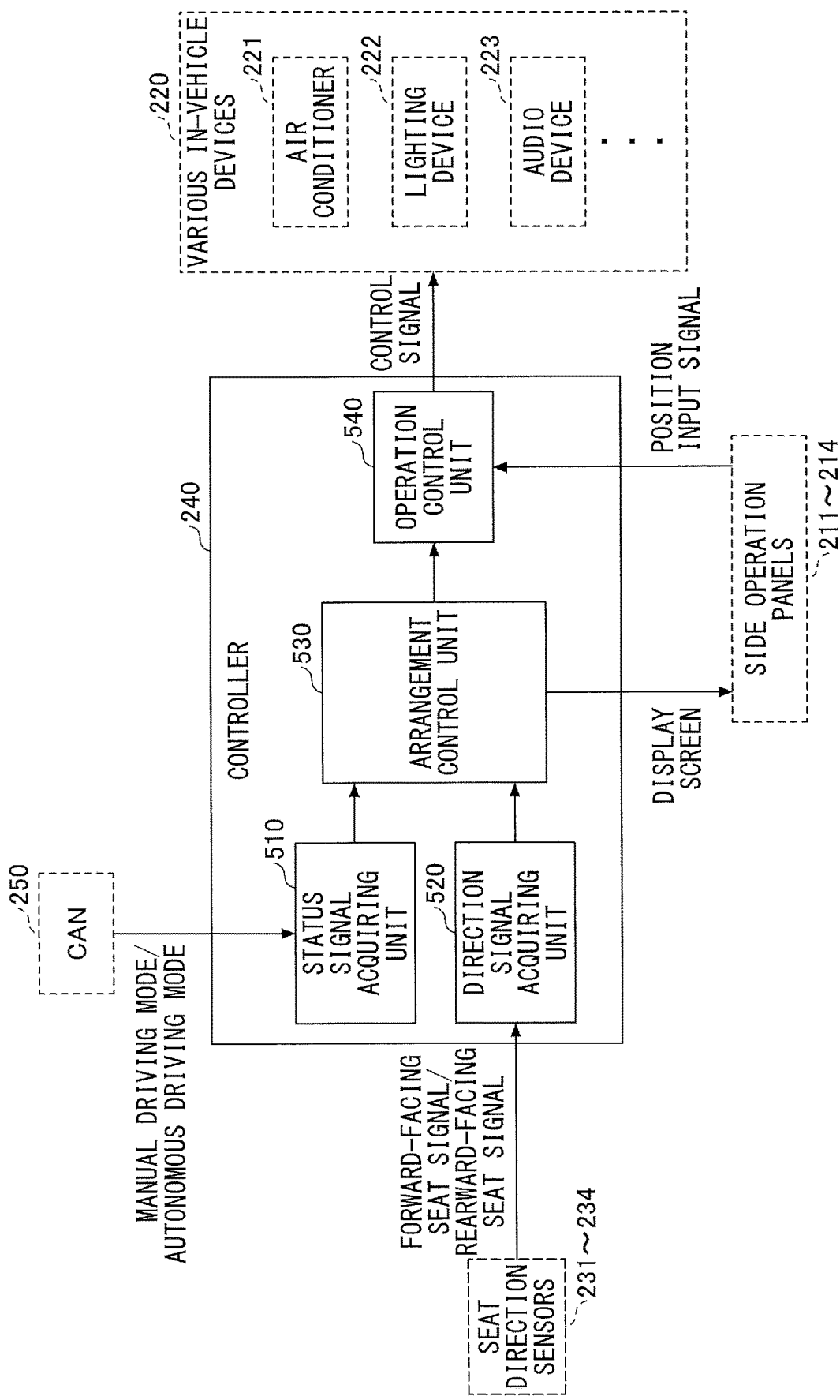
FIG. 5 is a diagram illustrating an example of a functional configuration of the controller.

Next, a functional configuration of the controller 240 will be described. FIG. 5 is a diagram illustrating an example of the functional configuration of the controller. As described above, the control program is installed in the controller 240, and the controller 240 functions as a status signal acquiring unit 510, a direction signal acquiring unit 520, an arrangement control unit 530, and an operation control unit 540 by the CPU 401 executing the control program.

The status signal acquiring unit 510 acquires a signal indicating whether the vehicle 100 is in autonomous driving mode or in manual driving mode from the CAN 250, and transmits the signal to the arrangement control unit 530. The direction signal acquiring unit 520 acquires a forward-facing seat signal or a rearward-facing seat signal from each of the seat direction sensors 231 to 234, and transmits the forward-facing seat signal or the rearward-facing seat signal to the arrangement control unit 530.

In response to receiving a signal indicating that the vehicle 100 is in autonomous driving mode from the status signal acquiring unit 510, the arrangement control unit 530 monitors a forward-facing seat signal or a rearward-facing seat signal of the driver's seat 101, transmitted from the direction signal acquiring unit 520. Note that the arrangement control unit 530 monitors a forward-facing seat signal or a rearward-facing seat signal of each of the front seat 301, the rear seat 102, and the rear seat 302, regardless of whether the status signal acquiring unit 510 transmits the forward-facing seat signal or the rearward-facing seat signal.

Further, the arrangement control unit 530 generates display screens to be displayed on the side operation panels 211 to 214. A display screen generated by the arrangement control unit 530 includes a plurality of operation elements, and at least some operation elements are arranged in the longitudinal direction of the vehicle 100. While the arrangement control unit 530 monitors a forward-facing seat signal or a rearward-facing seat signal, the arrangement control unit 530 reverses the arrangement of the operation elements in the longitudinal direction of the vehicle 100 in accordance with the forward-facing seat signal or the rearward-facing seat signal.

Further, the arrangement control unit 530 transmits the generated display screens to the side operation panels 211 to 214. In addition, the arrangement control unit 530 transmits information indicating the arrangement of operation elements on the generated display screens.

The operation control unit 540 acquires the information indicating the arrangement of the operation elements on the display screens, from the arrangement control unit 530. Further, in response to receiving a position input signal from any of the side operation panels 211 to 214, the operation control unit 540 identifies an operation element corresponding to the position input signal based on the acquired information indicating the arrangement of the operation elements. In addition, the operation control unit 540 transmits a control signal in accordance with the identified operation element to a corresponding in-vehicle device 220.

<Arrangement Control Processes>

Figure 6:
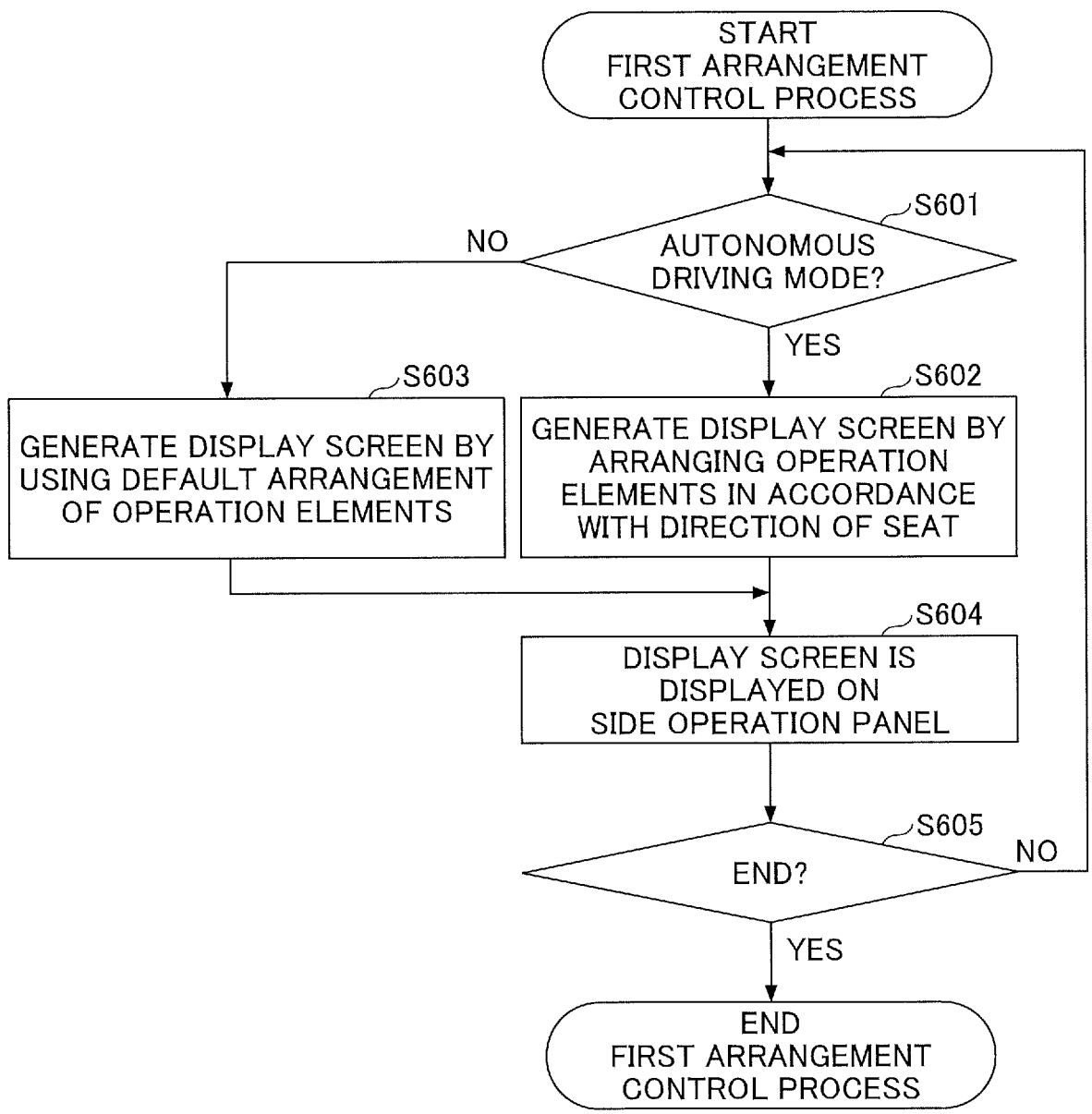
FIG. 6 is a flowchart illustrating a first arrangement control process performed by an arrangement control unit.

Next, a first arrangement control process performed by the arrangement control unit 530 to generate a display screen to be displayed on the side operation panel 211 operated by the driver, and a second arrangement control process performed by the arrangement control unit 530 to generate display screens to be displayed on the side operation panels 212, 213, and 214 operated by passengers other than the driver will be separately described. FIG. 6 is a flowchart illustrating the first arrangement control process performed by the arrangement control unit. In the first arrangement control process illustrated in FIG. 6, a display screen to be displayed on the side operation panel 211 operated by the driver is generated.

In step S601, the arrangement control unit 530 determines whether a signal indicating that the vehicle 100 is in autonomous driving mode is received from the status signal acquiring unit 510. In step S601, if it is determined that a signal indicating that the vehicle 100 is in autonomous driving mode is received (yes in step S601), the process proceeds to step S602.

In step S602, the arrangement control unit 530 generates a display screen to be displayed on the side operation panel 211 by arranging operation elements in accordance with the direction of the driver's seat.

Conversely, in step S601, if it is determined that a signal indicating that the vehicle 100 is in autonomous driving mode is not received (no in step S601) (that is, a signal indicating that the vehicle 100 is in manual driving mode is received), the process proceeds to step S603. In step S603, the arrangement control unit 530 generates a display screen to be displayed on the side operation panel 211 by using a default arrangement of operation elements.

In step S604, the arrangement control unit 530 transmits the generated display screen to the side operation panel 211. Accordingly, the display screen is displayed on the side operation panel 211.

In step S605, the arrangement control unit 530 determines whether to end the first arrangement control process. In step S605, when the arrangement control unit 530 determines not to end first the arrangement control process (no in step S605), the process returns to step S601. Conversely, in step S605, when the arrangement control unit 530 determines to end the first arrangement control process (yes in step S605), the process ends.

Figure 7:
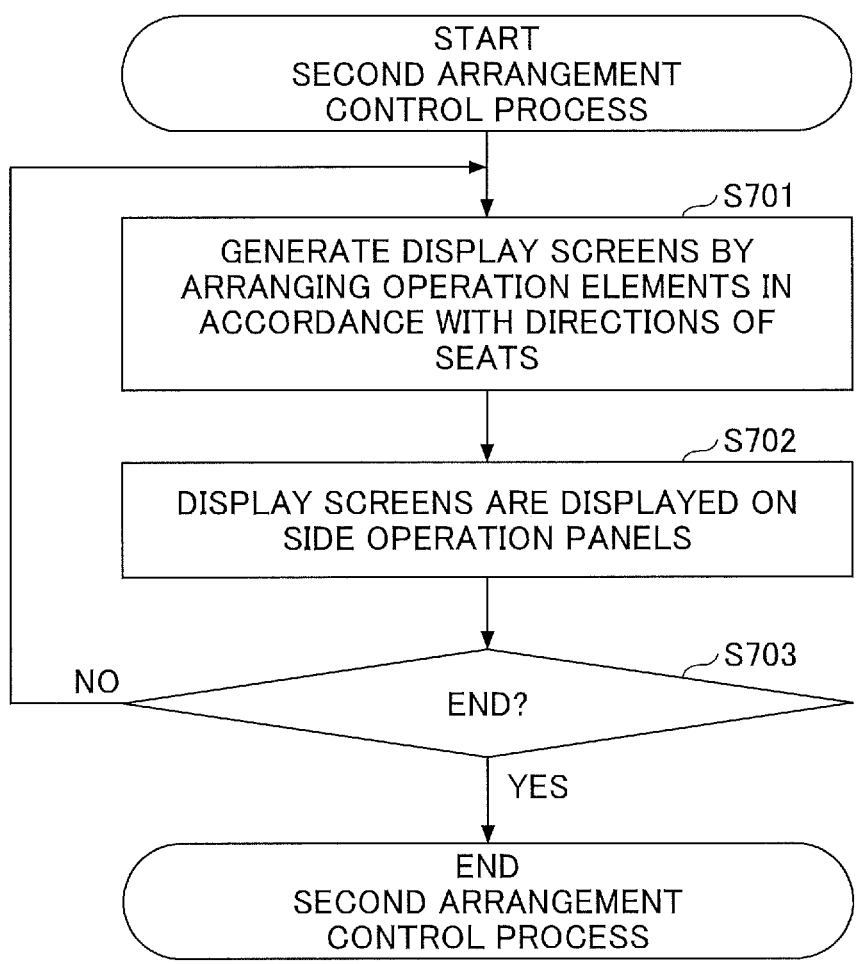
FIG. 7 is a flowchart illustrating a second arrangement control process performed by the arrangement control unit.

Next, the second arrangement control process for generating display screens displayed on the side operation panels 212, 213, and 214 operated by the passengers other than the driver will be described. FIG. 7 is a flowchart illustrating the second arrangement control process performed by the arrangement control unit. In the second arrangement control process illustrated in FIG. 7, display screens to be displayed on the side operation panels 212, 213, and 214 operated by the passengers other than the driver are generated.

In step S701, the arrangement control unit 530 generates display screens to be displayed on the side operation panels 212, 213, and 214 by arranging operation elements in accordance with the directions of the passengers' seats.

In step S702, the arrangement control unit 530 transmits the generated display screens to the side operation panels 212, 213, and 214. Accordingly, the display screens are displayed on the side operation panels 212, 213, and 214.

In step S703, the arrangement control unit 530 determines whether to end the second arrangement control process. If the arrangement control unit 530 determines not to end the second arrangement control process in step S703 (no in step S703), the process returns to step S701. Conversely, if the arrangement control unit 530 determines to end the second arrangement control process in step S703 (yes in step S703), the process ends.

<Examples of Display Screens>

Next, examples of display screens will be described. In the following, an example of a display screen displayed on the side operation panel 211 when the driver is seated facing forward, and an example display screen displayed on the side operation panel 211 when the driver is seated facing rearward will be described.

(1) First Examples of Display Screens

FIGS. 8A and 8B are diagrams illustrating first examples of display screens displayed on the side operation panel 211. FIG. 8A illustrates an example of a display screen displayed when the driver is seated facing forward. In the example of FIG. 8A, the display screen is displayed on the side operation panel 211, and includes an air conditioner operation area 810 (a first area) and an audio operation area 820 (a second area) arranged in the longitudinal direction of the vehicle 100. The air conditioner operation area 810 includes a plurality of operation elements for the air conditioner 221, and the audio operation area 820 includes a plurality of operation elements for the audio device 223.

As illustrated in FIG. 8A, when the driver is seated facing forward, the audio operation area 820 is located on the near side of the side operation panel 211 as viewed from the driver, and the air conditioner operation area 810 is located on the far side as viewed from the driver.

In FIGS. 8A and 8B, the arrangement control unit 530 arranges the audio operation area 820 and the air conditioner operation area 810 such that the arrangement of the audio operation area 820 and the air conditioner operation area 810 as viewed from the driver is maintained.

FIG. 8B illustrates an example of a display screen displayed when the driver is seated facing rearward. As illustrated in FIG. 8B, when the driver is seated facing rearward, the arrangement control unit 530 reverses the arrangement of the audio operation area 820 and the air conditioner operation area 810 in the longitudinal direction of the vehicle 100.

Accordingly, even when the driver is seated facing rearward, the audio operation area 820 is located on the near side as viewed from the driver, and the air conditioner operation area 810 is located on the far side as viewed from the driver. As a result, it is possible to reduce discomfort when the driver operates the side operation panel 211 after the direction of the driver's seat is changed.

(2) Second Examples of Display Screens

FIGS. 9A and 9B are diagrams illustrating second examples of display screens displayed on the side operation panel 211. FIG. 9A illustrates an example of a display screen displayed when the driver is seated facing forward. In the example of FIG. 9A, the display screen is displayed on the side operation panel 211, and includes the audio operation area 820 in which the plurality of operation elements for the audio device 223 are arranged in the longitudinal direction of the vehicle 100.

As illustrated in FIG. 9A, when the driver is seated facing forward, an operation element 822 for instructing to play audio is located on the near side of the side operation panel 211 as viewed from the driver, and an operation element 821 for instructing to stop audio is located on the far side as viewed from the driver.

In FIGS. 9A and 9B, the arrangement control unit 530 arranges the operation element 822 for instructing to play audio and the operation element 821 for instructing to stop audio in the audio operation area 820, such that the arrangement of the operation element 822 and the operation element 821 as viewed from the driver is maintained.

FIG. 9B illustrates an example of a display screen displayed when the driver is seated facing rearward. As illustrated in FIG. 9B, when the driver is seated facing rearward, the arrangement control unit 530 reverse the arrangement of the operation element 822 for instructing to play audio and the operation element 821 for instructing to stop audio in the longitudinal direction of the vehicle 100.

Accordingly, even when the driver is seated facing rearward, the operation element 822 for instructing to play audio is located on the near side as viewed from the driver, and the operation element 821 for instructing to stop audio is located on the far side as viewed from the driver. As a result, it is possible to reduce discomfort when the driver operates the side operation panel 211 after the direction of the driver's seat is changed.

In addition, in the example of FIG. 9B, when the arrangement control unit 530 reveres the operation element 822 for instructing to play audio and the operation element 821 for instructing to stop audio, the arrangement control unit 530 also reverses the orientation of the operation element 821 for instructing to play audio. Accordingly, it is possible to reduce discomfort when the driver operates the side operation panel 211 after the direction of the driver's seat is changed.

(3) Third Examples of Display Screens

Figure 10A:
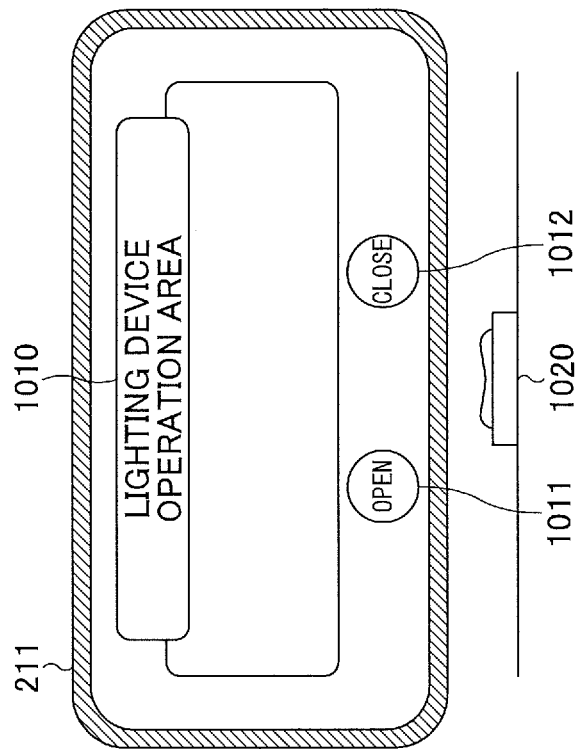
FIGS. 10A and 10B are diagrams illustrating third examples of display screens displayed on the side operation panel.
Figure 10B:
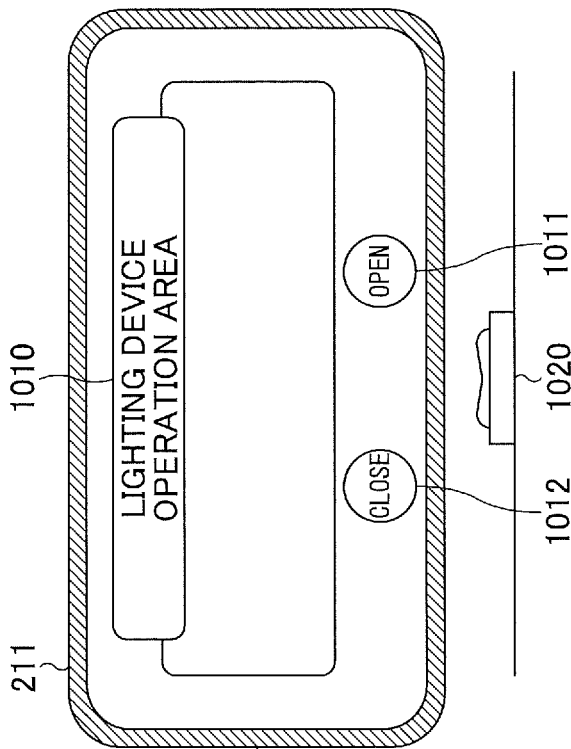

FIGS. 10A and 10B are diagrams illustrating third examples of display screens displayed on the side operation panel. FIG. 10A illustrates an example of a display screen displayed when the driver is seated facing forward. In the example of FIG. 10A, the display screen is displayed on the side operation panel 211, and includes a lighting device operation area 1010 and guide elements for guiding operations of an operation switch 1020 that is provided outside the side operation panel 211. The guide elements are arranged in the longitudinal direction of the vehicle 100, and includes a guide element 1011 for guiding an opening operation of the operation switch 1020, and a guide element 1012 for guiding a closing operation of the operation switch 1020.

For example, the operation switch 1020 may be an operation switch for opening or closing a window beside the driver's seat 101. The operation switch 1020 may be configured to open the window when one of the elements is operated, and close the window when the other element is operated.

As illustrated in FIG. 10A, when the driver is seated facing forward, the guide element 1012 for guiding the closing operation is located on the near side of the side operation panel 211 as viewed from the driver, and the guide element 1011 for guiding the opening operation is located on the far side as viewed from the driver.

In FIGS. 10A and 10B, the arrangement control unit 530 arranges the guide element 1011 for guiding the opening operation and the guide element 1012 for guiding the closing operation, such that the arrangement of the guide element 1011 and the guide element 1012 as viewed from the driver is maintained.

FIG. 10B illustrates an example of a display screen displayed when the driver is seated facing rearward. As illustrated in FIG. 10B, when the driver is seated facing rearward, the arrangement control unit 530 reverses the arrangement of the guide element 1011 for guiding the opening operation and the guide element 1012 for guiding the closing operation in the longitudinal direction of the vehicle 100.

Accordingly, even when the driver is seated facing rearward, the guide element 1012 for guiding the closing operation is located on the near side as viewed from the driver, and the guide element 1011 for guiding the opening operation is located on the far side as viewed from the driver. As a result, it is possible to reduce discomfort when the driver operates the side operation panel 211 after the direction of the driver's seat is changed. Note that the assignment of control signals in accordance with the opening operation and the closing operation (the assignment of control signals for enabling the operations in accordance with the guide element 1011 for guiding the opening operation and the guide element 1012 for guiding the closing operation) are controlled separately.

SUMMARY

As is clear from the above description, the operation system 200 according to the first embodiment
acquires a signal indicating whether a vehicle is in autonomous driving mode or in manual driving mode,
generates a display screen, to be displayed on a side operation panel installed in the vehicle, by arranging at least two operation elements (or guide elements) in the longitudinal direction of the vehicle,
monitors a forward-facing seat signal or a rearward-facing seat signal of a driver's seat when the vehicle is in autonomous driving mode, and reverses the arrangement of at least two operation elements (or guide elements) in the longitudinal direction of the vehicle in accordance with the forward-facing seat signal or the rearward-facing seat signal, and
monitors a forward-facing seat signal or a rearward-facing seat signal of a passenger's seat (other than the driver's seat) regardless of whether the vehicle is in the autonomous driving mode, and reverses the arrangement of at least two operation elements (or guide elements) in the longitudinal direction of the vehicle in accordance with the forward-facing seat signal or the rearward-facing seat signal.

Accordingly, in the first embodiment, the arrangement of the operation elements as viewed from the driver or a passenger is maintained, thus reducing discomfort when the driver or the passenger operates an operation panel after having changed the seat direction.

Second Embodiment

In the above-described first embodiment, the various in-vehicle devices 220 controlled by the controller 240 include the air conditioner 221, the lighting device 222, and the audio device 223; however, the various in-vehicle devices 220 controlled by the controller 240 are not limited thereto.

Further, in the above-described first embodiment, in FIGS. 8A and 8B, the display screen including the air conditioner operation area 810 and the audio operation area 820 is displayed on the side operation panel 211. However, a combination of operation areas displayed on the side operation panel 211 is not limited thereto, and any combination (a combination of an operation area of a first device and an operation area of a second device) may be displayed on the side operation panel 211.

Further, in the above-described first embodiment, in FIG. 9A through FIG. 10B, specific examples of operation elements and guide elements displayed on the side operation panel 211 have been described; however, operation elements and guide elements are not limited to those in the above-described example. Note that operation elements and guide elements that may cause discomfort to an occupant by being reversely arranged are excluded; however any other operation elements and guide elements may be reversely arranged. Examples of the operation elements and guide elements that may cause discomfort by being reversely arranged include:
an operation element for instructing to increase the temperature or the air flow rate of the air conditioner and an operation element for instructing to decrease the temperature or the air flow rate;
an operation element for instructing to rewind the audio device and an operation element for instructing to forward the audio device;
an operation element for instructing to increase the volume of the audio device and an operation element for an instruction to decrease the volume,
an operation element for instructing to increase the illuminance of the lighting device and an operation element for instructing to decrease the illuminance, and
any other operation elements and guide elements that instructs to change the amount or the order.

Further, in the above-described first embodiment, the vehicle is equipped with the four seats, and the side operation panels 211 to 214 are installed at corresponding positions of the respective four seats; however, the number of seats in the vehicle is not limited to four. In addition, the side operation panels are not required to be installed at corresponding positions of all the seats.

Further, in the above-described first embodiment, the status signal acquiring unit 510, the direction signal acquiring unit 520, the arrangement control unit 530, and the operation control unit 540 are implemented by the controller 240. However, some of the functions implemented by the controller 240 may be implemented by the side operation panels 211 to 214.

Although the present invention has been described with reference to embodiments, the present invention is not limited to the configurations as described in the embodiments, and the configurations as described in the embodiments may be combined with other elements. It should be noted that combination of the elements of the above-described embodiments may be changed without departing from the scope of the present invention, and may be determined in accordance with applications as appropriate.

What is claimed is:

1. An operation system for installation in a vehicle, the operation system comprising:
a memory; and
a processor coupled to the memory and configured to acquire a first signal indicating whether a seat in the vehicle is facing forward or rearward, and
generate a display screen by arranging at least two operation elements in a longitudinal direction of the vehicle, the display screen being displayed on an operation panel installed on a surface of a door panel inside the vehicle, wherein
the processor reverses the arrangement of the at least two operation elements in the longitudinal direction of the vehicle in accordance with the first signal while maintaining an orientation of each of the at least two operation elements.

2. The operation system according to claim 1, the processor is further configured to acquire a second signal indicating whether the vehicle is in autonomous driving mode or in manual driving mode, wherein
in a case where the second signal indicates that the vehicle is in the autonomous driving mode, the processor reverses the arrangement of the at least two operation elements in the longitudinal direction of the vehicle in accordance with the first signal.

3. The operation system according to claim 1, the processor is further configured to receive a position input signal from the operation panel, and transmit a control signal to a device installed in the vehicle, wherein
in a case where the processor receives the position input signal from the operation panel, the processor identifies an operation element corresponding to the position input signal based on information indicating the arrangement of the at least two operation elements on the display screen, and transmits the control signal in accordance with the identified operation element.

4. The operation system according to claim 1, wherein, in a case where the processor generates the display screen by arranging a first area, including a plurality of first operation elements for operation of a first device, and a second area, including a plurality of second operation elements for operation of a second device, in the longitudinal direction of the vehicle, the processor reverses the arrangement of the first area and the second area in the longitudinal direction of the vehicle in accordance with the first signal, the first device and the second device being installed in the vehicle.

5. The operation system according to claim 1, wherein the processor reverses an orientation of any of the at least two operation elements in the longitudinal direction of the vehicle in accordance with the first signal.

6. A control method comprising:
acquiring a signal indicating whether a seat in a vehicle is facing forward or rearward; and
generating a display screen by arranging at least two operation elements in a longitudinal direction of the vehicle, the display screen being displayed on an operation panel installed on a surface of a door panel inside the vehicle, wherein
the generating includes reversing the arrangement of the at least two operation elements in the longitudinal direction of the vehicle in accordance with the signal while maintaining an orientation of each of the at least two operation elements.

7. The operation system according to claim 1, wherein the operation panel is located on the surface of the door panel inside the vehicle so that the operation panel is accessible from the seat when the seat is facing forward and when the seat is facing rearward.

* * * * *